(12) United States Patent
Lin et al.

(10) Patent No.: US 9,169,402 B2
(45) Date of Patent: Oct. 27, 2015

(54) TITANIUM-CONTAINING CERAMIC PAINT AND PROTECTIVE COATING

(71) Applicant: Innotek Technology (China) Limited, Wuxi, Jiangsu (CN)

(72) Inventors: Hsueh-Tso Lin, Hsinchu (TW); Dick Zhong, Arcadia, CA (US)

(73) Assignee: Innotek Technology (China) Limited, Jiangsu (CN)

( * ) Notice: Subject to any disclaimer, the term of this patent is extended or adjusted under 35 U.S.C. 154(b) by 125 days.

(21) Appl. No.: 13/941,430

(22) Filed: Jul. 12, 2013

(65) Prior Publication Data

US 2014/0170425 A1    Jun. 19, 2014

(30) Foreign Application Priority Data

Dec. 13, 2012   (CN) .......................... 2012 1 0539369

(51) Int. Cl.
   *B32B 5/16*      (2006.01)
   *B32B 17/06*     (2006.01)
   *C09D 1/00*     (2006.01)

(52) U.S. Cl.
   CPC ........... *C09D 1/00* (2013.01); *Y10T 428/31663* (2015.04)

(58) Field of Classification Search
None
See application file for complete search history.

(56) References Cited

U.S. PATENT DOCUMENTS

2013/0149524 A1*   6/2013   Lin et al. ....................... 428/323

FOREIGN PATENT DOCUMENTS

| CN | 1266760 | 9/2000 |
|---|---|---|
| CN | 1845975 | 10/2006 |
| CN | 102690536 | 9/2012 |

OTHER PUBLICATIONS

Taiwan Patent Office, Office Action, Patent Application Serial No. 102118579, Feb. 10, 2015, Taiwan.

* cited by examiner

*Primary Examiner* — Sheeba Ahmed

(57) ABSTRACT

Disclosed is a titanium-containing ceramic paint, including 100 parts by weight of silica sol, 50 to 100 parts by weight of organic silane, 0.3 to 1 parts by weight of a catalyst, 5 to 20 parts by weight of titanium powder, and 1 to 5 parts by weight of a silicone oil. The organic silane can be methyltrimethoxy silane and/or methyltriethoxy silane. The catalyst can be formic acid, acetic acid, hydrochloric acid, citric acid, methyl formate, ethyl acetoacetate, maleic anhydride, or combinations thereof. The titanium-containing ceramic paint may further include 30 to 50 parts by weight of filler, such as silica, alumina, zirconium dioxide, silicon carbide, aluminum nitride, boron nitride, kaolin, talcum powder, mica powder, silicate of aluminum or zirconium, barium sulfate, metal fiber, stainless powder, or combinations thereof. The titanium-containing ceramic paint may further include 30 to 40 parts by weight of a color powder.

24 Claims, No Drawings

TITANIUM-CONTAINING CERAMIC PAINT AND PROTECTIVE COATING

CROSS REFERENCE TO RELATED APPLICATIONS

This application claims priority of China Patent Application No. 201210539369.0, filed on Dec. 13, 2012, the entirety of which is incorporated by reference herein.

BACKGROUND

1. Technique Field

The disclosure relates to a ceramic paint and a coating utilizing the same, and in particular, relates to a titanium-containing ceramic paint and a protective coating.

2. Description of the Related Art

Ceramic paints are novel aqueous inorganic paints, which are primarily composed of a nano inorganic compound dispersed in water. A ceramic paint is usually coated and then cured with a low temperature to form a coating film. Similar to the characteristics of ceramic, the coating film has several advantages such as high temperature resistance, high hardness, non-smoke flame retardation, super climate resistance, and being environmentally friendly, non-toxic, colorful, and easy to coat on a substrate.

In recent years, ceramic paints have been applied to cooking tools due to its safety. The conventional coating agent for non-stick cooking tools is polytetrafluoroethylene (PTFE). Although PTFE has an excellent non-stick property for a long period, the PTFE film is too soft to resist abrasion under high temperatures, as it tends to soften. Compared to conventional PTFE, ceramic paint has advantages such as being environmental friendly, difficulty to peel, and difficulty to decompose at high temperatures. In CN 101190851A, a non-stick purple sand ceramic paint for cooking tools is disclosed. The paint can be applied to form a dense ceramic on a surface of metal or alloy, thereby enhancing the surface hardness and abrasion resistance of the cooking tools. In addition, the dense ceramic has an excellent non-stick property. In CN 102653660A, a ceramic paint with an abrasion resistance for non-stick cooking tools is disclosed, wherein the ceramic paint is primarily composed of silica sol, alumina sol, zirconia sol, and organic silane. The metal oxide sol and polysiloxane are reacted through condensation polymerization, thereby enhancing the adhesive strength of the coating film. However, the coating film is formed by complex steps, and the ceramic paint has many components.

Accordingly, a ceramic paint with better properties (especially the abrasion resistance) for cooking tools is called-for.

BRIEF SUMMARY

One embodiment of the disclosure provides a titanium-containing ceramic paint, comprising: 100 parts by weight of silica sol; 50 to 100 parts by weight of organic silane; 0.3 to 1 parts by weight of a catalyst; 5 to 20 parts by weight of titanium powder; and 1 to 5 parts by weight of a silicone oil.

One embodiment of the disclosure provides a protective coating manufactured from the described titanium-containing ceramic paint.

A detailed description is given in the following embodiments with reference to the accompanying drawings.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

The silica sol (water soluble silica) which provides silica particles in a ceramic paint to enhance the strength and hardness of a silicon ceramic network. In one embodiment, the silica sol has a solid content of 20% to 50%, and the solid has a particle diameter of 8 nm to 50 nm. The silica sol can be stabilized by sodium ions, stabilized by ammonium ions, or treated by alumina. A silica sol having an overly low solid content will make a ceramic paint contain too much water, making it difficult to process but easily blast. A silica sol having an overly high solid content will be non-stable, such that large particles will easily form therein.

In one embodiment, the organic silane can be methyltrimethoxy silane and/or methyltriethoxy silane, and preferably methyltrimethoxy silane. In addition, 5 to 10 parts by weight of an additional organic silane such as tetramethoxy silane, tetraethoxy silane, dimethyldimethoxy silane, dimethyldiethoxy silane, phenyltrimethoxy silane, or combinations thereof can be added to the titanium-containing ceramic paint for tuning the hardness of a protective coating manufactured from the titanium-containing ceramic paint. The organic silane may react with the silica sol to form the silica sol-gel. A protective coating made of a ceramic paint having an overly high amount of the organic silane will condense too much during a baking process due to over dehydration (or removal of methanol or ethanol), such that the protective coating will easily chap or peel. A protective coating made of a ceramic paint having an overly low amount of the organic silane will not satisfactorily adhere to a substrate, easily peel, have a low brightness, and be easily pulverized.

In one embodiment, the catalyst can be formic acid, acetic acid, hydrochloric acid, citric acid, methyl formate, ethyl acetoacetate, maleic anhydride, or combinations thereof. The catalyst may accelerate the hydrolysis rate of the organic silane and the reaction between the hydrolyzed organic silane and the silica sol. A protective coating made of a ceramic paint having an overly high or overly low amount of the catalyst may not be bright, have poor adhesion ability to a substrate, and be even pulverized.

A titanium powder has excellent physical properties, mechanical properties, and corrosion resistance. For example, the titanium powder is stable in many corrosive mediums of industry departments such as food, metallurgy, chemical engineering, paper making, and the likes. The titanium powder may enhance hardness and abrasion resistance of the ceramic paint in the disclosure. In one embodiment, the titanium powder has a particle diameter of 200 mesh to 400 mesh. A protective coating made of a ceramic paint having an overly large titanium powder will have a rough surface and degrade the coating appearance. A protective coating made of a ceramic paint having an overly small titanium powder will have low abrasion resistance.

In one embodiment, the silicone oil can be a hydroxy silicone oil with a viscosity of 100 cps to 20000 cps. The silicone oil may enhance a non-stick property of a protective coating made of a ceramic paint. If a protective coating made of the titanium-containing ceramic paint is used to contact food, the silicone oil should be safe while contacting food.

In one embodiment, 30 to 50 parts by weight of filler can be added into the titanium-containing ceramic paint. In one embodiment, the filler can be silica such as silica powder or melt quartz powder, alumina such as alumina fiber, zirconium dioxide, silicon carbide such as silicon carbide fiber, aluminum nitride, boron nitride, kaolin, talcum powder, mica powder, silicate of aluminum or zirconium, barium sulfate, metal fiber, stainless powder, or combinations thereof, and preferably silica, alumina, silicon carbide, talcum powder, zirconium dioxide, or combinations thereof. The filler may enhance the abrasive resistance of the protective coating. A protective coating made of a ceramic paint containing an overly high amount of the filler will have low brightness to degrade its appearance, not satisfactorily adhere to a substrate, and easily chap due to insufficient adhesion. A protective coating made of a ceramic paint containing an overly low amount of the filler will have poor abrasion resistance. A suitable filler amount will enhance the adhesion between the protective coating and the substrate, and promise the hardness and the abrasion resistance of the protective coating. In one embodiment, the filler has a particle diameter of 0.05 µm to 30 µm. A protective coating made of a ceramic paint containing an overly large filler will have a rough surface, such that a finish coat spray coated thereon will have low brightness and poor non-stick properties. A ceramic paint containing an overly small filler has high viscosity due its high oil adsorption capacity, thereby negatively influencing the processability when spray coating.

In one embodiment, the titanium-containing ceramic paint further includes 30 to 40 parts by weight of a color powder to tune a color thereof for decoration. The color powder can be an inorganic color powder, such as a white powder of titanium oxide or zinc sulfide, a black powder of copper-chromium-manganese oxide, copper-manganese oxide, copper-manganese-iron oxide, or iron oxide, a yellow powder of titanium yellow or bismuth yellow, a green powder of cobalt green or chromium oxide, and a blue powder such as cobalt-chromium-aluminum oxide. The color powder can be used individually or in combinations. If a protective coating made of the titanium-containing ceramic paint is used to contact food, the color powder should be safe while contacting food.

The disclosure also provides a method of manufacturing the titanium-containing ceramic paint. The silica sol and the titanium powder are fully dispersed until precipitation completely disappears, thereby obtaining a Liquid A. The organic silane, silicone oil, and the catalyst are evenly mixed to obtain a Liquid B. The Liquid B is added to the Liquid A, ripened for 1.5 hours to 12 hours, and then filtered by a strainer of 100 mesh to 150 mesh to form a titanium-containing ceramic paint.

When the titanium-containing ceramic paint further includes color powder and/or the filler, the silica sol, the titanium powder, and the color powder and/or the filler are mixed and grinded until precipitation completely disappears, thereby obtaining a Liquid A. The organic silane, the silicone oil, and the catalyst are evenly mixed to obtain a Liquid B. The Liquid B is added to the Liquid A, ripened for 1.5 hours to 12 hours, and then filtered by a strainer of 100 mesh to 150 mesh to form a titanium-containing ceramic paint.

A protective coating made of the titanium-containing ceramic paint can be prepared as follows. First, the titanium-containing ceramic paint can be coated on a sandblasted, roughed, and degreased surface of a substrate. The substrate can then be baked at 150° C. for 2 minutes, baked at 280° C. for 10 to 15 minutes, and then cooled at room temperature for completion of a protective coating. The substrate may resist at least 400° C., such as a non-metal substrate (e.g. glass or ceramic) or a metal substrate (e.g. aluminum, aluminum alloy, anodic aluminum oxide, casting aluminum, casting iron, stainless steel, or carbon steel). The ceramic paint can be spray coated, dip coated, or roll coated on the substrate. The non-stick protective coating can be applied on kitchenware such as wok, pan, fryer, automatic cooker, sandwich baking pan, cake pan, or grill, and industry tools such as thermal transfer, mold, conveyor belt, valve, snow shovel, or roller.

EXAMPLES

The names and sources of agents used in the Examples and Comparative Examples are listed as below:

(1) Titanium powders: 200 mesh, 300 mesh, and 400 mesh titanium powders commercially available from Chengdu GUOHENGKEJI Co., Ltd.

(2) Silicone oil: XIAMETER® PMX-0156 (with a viscosity of 100 cps) commercially available from Dow Corning Corporation, and Polymer FD 6 (with a viscosity of 6000 cps) and Polymer FD 20 (with a viscosity of 20000 cps) commercially available from Wacker Chemicals.

(3) Silica sol: LUDOX® AM-30 commercially available from W. R. Grace & Co., USA.

The properties of the protective coatings were measured as below:

(1) Coating Hardness Test

The hardness of the protective coating was tested by the ASTM D 3363 standard.

(2) Non-Stick Test

A wok was heated to 160° C. to 180° C., a fresh egg was then crack opened and then flown into the wok. The egg was then left on the wok at 160° C. to 180° C. for 2 to 3 minutes. After one side (contacting the wok) of the heated egg was yellowed, a turning shovel was used to check if the egg was completely flipped or not. After removing the egg, the wok was cleaned by a cloth. The cycle of heating the egg, flipping the egg, removing the egg, and cleaning the wok was repeated until the heated egg could not be completely flipped. The number of cycles were counted and recorded.

(3) Abrasive Resistance Test

The wok with the protective coating thereon was put on an abrasion machine (Dupont). A small amount of detergent and water was poured onto the wok, and a cleaning pad (3M-7447#) was pressed on the wok by the abrasion machine with a pressure of 4.9 kg to rub the wok surface. The cleaning pad was replaced after 250 rubbing actions. The test was terminated after 10 scratches occurred on the protective coating to expose the wok surface. The number of times for rubbing were counted and recorded.

Example 1

100 parts by weight of silica sol and 5 parts by weight of titanium powder were fully dispersed until precipitation completely disappeared, thereby obtaining a Liquid A. 50 parts by weight of methyltrimethoxy silane, 3 parts by weight of a silicone oil PMX-0156, and 0.3 parts by weight of formic acid were evenly mixed to form a Liquid B. The Liquid B was added into the Liquid A, then ripened for 1.5 hours, and then filtered by a 100 mesh to 150 mesh strainer, thereby obtaining a titanium-containing ceramic paint.

Example 2

100 parts by weight of silica sol, 10 parts by weight of titanium powder, and 40 parts by weight of copper-manganese-iron oxide were mixed and grinded until precipitation completely disappeared, thereby obtaining a Liquid A. 70 parts by weight of methyltriethoxy silane, 5 parts by weight of phenyltrimethoxy silane, 1 part by weight of a silicone oil FD 20, and 1 part by weight of acetic acid were evenly mixed to form a Liquid B. The Liquid B was added into the Liquid A, then ripened for 12 hours, and then filtered by a 100 mesh to 150 mesh strainer, thereby obtaining a titanium-containing ceramic paint.

Example 3

100 parts by weight of silica sol, 12 parts by weight of titanium powder, and 30 parts by weight of titanium oxide powder were mixed and grinded until precipitation completely disappeared, thereby obtaining a Liquid A. 50 parts by weight of methyltrimethoxy silane, 25 parts by weight of methyltriethoxy silane, 5 part by weight of a silicone oil PMX-0156, and 0.8 parts by weight of acetic acid were evenly mixed to form a Liquid B. The Liquid B was added into the Liquid A, then ripened for 6 hours, and then filtered by a 100 mesh to 150 mesh strainer, thereby obtaining a titanium-containing ceramic paint.

Example 4

100 parts by weight of silica sol, 17 parts by weight of titanium powder, 35 parts by weight of titanium oxide powder, 30 parts by weight of silica, and 2 parts by weight of silicon carbide were mixed and grinded until precipitation completely disappeared, thereby obtaining a Liquid A. 60 parts by weight of methyltrimethoxy silane, 10 parts by weight of methyltriethoxy silane, 4 part by weight of a silicone oil PMX-0156, and 0.9 parts by weight of acetic acid were evenly mixed to form a Liquid B. The Liquid B was added into the Liquid A, then ripened for 8 hours, and then filtered by a 100 mesh to 150 mesh strainer, thereby obtaining a titanium-containing ceramic paint.

Example 5

100 parts by weight of silica sol, 20 parts by weight of titanium powder, 30 parts by weight of titanium oxide powder, 10 parts by weight of copper-chromium-manganese oxide, and 50 parts by weight of alumina were mixed and grinded until precipitation completely disappeared, thereby obtaining a Liquid A. 100 parts by weight of methyltrimethoxy silane, 10 parts by weight of phenyltrimethoxy silane, 2 part by weight of a silicone oil FD 6, and 0.5 parts by weight of formic acid were evenly mixed to form a Liquid B. The Liquid B was added into the Liquid A, then ripened for 2 hours, and then filtered by a 100 mesh to 150 mesh strainer, thereby obtaining a titanium-containing ceramic paint.

Comparative Example 1

Compared to Example 1, Comparative Example 1 was free of the titanium powder. The other process factors, the other components, and the other component amounts in Comparative Example 1 were similar to that in Example 1.

Comparative Example 2

Compared to Example 3, Comparative Example 2 was free of the titanium powder. The other process factors, the other components, and the other component amounts in Comparative Example 2 were similar to that in Example 3.

Comparative Example 3

Compared to Example 5, Comparative Example 3 was free of the titanium powder. The other process factors, the other components, and the other component amounts in Comparative Example 3 were similar to that in Example 5

Preparing the Protective Coating

The ceramic paints of Examples 1-5 and Comparative Examples 1-3 were spray coated on a sandblasted, roughed, and degreased surface of a substrate. The substrate was then baked at 150° C. for 2 minutes, baked at 280° C. for 10 to 15 minutes, and then cooled at room temperature for completion of a protective coating on the substrate surface.

The properties of the protective coatings made of the ceramic paints in Examples 1-5 and Comparative Examples 1-3 were tabulated in Tables 1 and 2, respectively.

As shown in table 1, the protective coatings made of the ceramic paints in Examples 1-5 had high cold hardness, high hot hardness, and non-stick properties. Compared to the Comparative Examples 1-3 in Table 2, the protective coatings made of the ceramic paints in Examples 1-5 had higher abrasion resistance.

TABLE 1

| | | Example 1 | Example 2 | Example 3 | Example 4 | Example 5 |
|---|---|---|---|---|---|---|
| | Silica sol | 100 | 100 | 100 | 100 | 100 |
| | Titanium powder | 5 | 10 | 12 | 17 | 20 |
| Organic silane | Methyltrimethoxy silane | 50 | 0 | 50 | 60 | 100 |
| | Methyl trimethoxy silane | 0 | 70 | 25 | 10 | 0 |
| | Phenyltrimethoxy silane | 0 | 5 | 0 | 0 | 10 |
| Silicone oil | PMX-0156 | 3 | 0 | 5 | 4 | 0 |
| | FD 6 | 0 | 0 | 0 | 0 | 2 |
| | FD 20 | 0 | 1 | 0 | 0 | 0 |
| Catalyst | Formic acid | 0.3 | 0 | 0 | 0 | 0.5 |
| | Acetic acid | 0 | 1 | 0.8 | 0.9 | 0 |
| Color powder | Titanium oxide | 0 | 0 | 30 | 35 | 30 |
| | Copper-manganese-iron oxide | 0 | 40 | 0 | 0 | 0 |
| | Copper-chromium-manganese oxide | 0 | 0 | 0 | 0 | 10 |
| Filler | Alumina | 0 | 0 | 0 | 0 | 50 |
| | Silica | 0 | 0 | 0 | 30 | 0 |
| | Silicon carbide | 0 | 0 | 0 | 2 | 0 |

TABLE 1-continued

|  |  | Example 1 | Example 2 | Example 3 | Example 4 | Example 5 |
|---|---|---|---|---|---|---|
| Properties |||||||
| Hardness | Cold | 9H | 9H | 9H | 9H | 9H |
|  | Hot | 9H | 9H | 9H | 9H | 9H |
| Not-stick property (cycle) |  | >50 | >50 | >50 | >50 | >50 |
| Abrasion resistance time |  | 1000 | 3000 | 4000 | 6000 | 8000 |

TABLE 2

|  |  | Comparative Example 1 | Comparative Example 2 | Comparative Example 3 |
|---|---|---|---|---|
|  | Silica sol | 100 | 100 | 100 |
|  | Titanium powder | 0 | 0 | 0 |
| Organic silane | Methyltrimethoxy silane | 50 | 50 | 100 |
|  | Methyl trimethoxy silane | 0 | 25 | 0 |
|  | Phenyltrimethoxy silane | 0 | 0 | 10 |
| Silicone oil | PMX-0156 | 3 | 5 | 0 |
|  | FD 6 | 0 | 0 | 2 |
|  | FD 20 | 0 | 0 | 0 |
| Catalyst | Formic acid | 0.3 | 0 | 0.5 |
|  | Acetic acid | 0 | 0.8 | 0 |
| Color powder | Titanium oxide | 0 | 30 | 30 |
|  | Copper-manganese-iron oxide | 0 | 0 | 0 |
|  | Copper-chromium-manganese oxide | 0 | 0 | 10 |
| Filler | Alumina | 0 | 0 | 50 |
|  | Silica | 0 | 0 | 0 |
|  | Silicon carbide | 0 | 0 | 0 |
| Properties |||||
| Hardness | Cold | 9H | 9H | 9H |
|  | Hot | 9H | 9H | 9H |
| Not-stick property(cycle) |  | >50 | >50 | >50 |
| Abrasion resistance time |  | 500 | 500 | 4000 |

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A titanium-containing ceramic paint, comprising:
100 parts by weight of silica sol;
50 to 100 parts by weight of organic silane;
0.3 to 1 parts by weight of a catalyst;
5 to 20 parts by weight of titanium powder; and
1 to 5 parts by weight of a silicone oil.

2. The titanium-containing ceramic paint as claimed in claim 1, wherein the silica sol has a solid content of 20% to 50%, and the solid has a particle diameter of 8 nm to 50 nm.

3. The titanium-containing ceramic paint as claimed in claim 1, wherein the organic silane is methyltrimethoxy silane and/or methyltriethoxy silane.

4. The titanium-containing ceramic paint as claimed in claim 1, further comprising 5 to 10 parts by weight of an additional organic silane, and the additional organic silane is tetramethoxy silane, tetraethoxy silane, dimethyldimethoxy silane, dimethyldiethoxy silane, phenyltrimethoxy silane, or combinations thereof.

5. The titanium-containing ceramic paint as claimed in claim 1, wherein the catalyst comprises formic acid, acetic acid, hydrochloric acid, citric acid, methyl formate, ethyl acetoacetate, maleic anhydride, or combinations thereof.

6. The titanium-containing ceramic paint as claimed in claim 1, wherein the silicone oil is a hydroxy silicone oil with a viscosity of 100 cps to 20000 cps at 25° C.

7. The titanium-containing ceramic paint as claimed in claim 1, further comprising 30 to 50 parts by weight of filler, and the filler comprises silica, alumina, zirconium dioxide, silicon carbide, aluminum nitride, boron nitride, kaolin, talcum powder, mica powder, silicate of aluminum or zirconium, barium sulfate, metal fiber, stainless powder, or combinations thereof.

8. The titanium-containing ceramic paint as claimed in claim 1, further comprising 30 to 40 parts by weight of a color powder.

9. A protective coating, being manufactured from the titanium-containing ceramic paint as claimed in claim 1.

10. The protective coating as claimed in claim 9, being applied on a kitchenware, a metal protection, or an industry tool.

11. A protective coating, being manufactured from the titanium-containing ceramic paint as claimed in claim 2.

12. The protective coating as claimed in claim 11, being applied on a kitchenware, a metal protection, or an industry tool.

13. A protective coating, being manufactured from the titanium-containing ceramic paint as claimed in claim 3.

14. The protective coating as claimed in claim 13, being applied on a kitchenware, a metal protection, or an industry tool.

15. A protective coating, being manufactured from the titanium-containing ceramic paint as claimed in claim 4.

16. The protective coating as claimed in claim 15, being applied on a kitchenware, a metal protection, or an industry tool.

17. A protective coating, being manufactured from the titanium-containing ceramic paint as claimed in claim 5.

18. The protective coating as claimed in claim 17, being applied on a kitchenware, a metal protection, or an industry tool.

19. A protective coating, being manufactured from the titanium-containing ceramic paint as claimed in claim 6.

20. The protective coating as claimed in claim 19, being applied on a kitchenware, a metal protection, or an industry tool.

21. A protective coating, being manufactured from the titanium-containing ceramic paint as claimed in claim 7.

22. The protective coating as claimed in claim 21, being applied on a kitchenware, a metal protection, or an industry tool.

23. A protective coating, being manufactured from the titanium-containing ceramic paint as claimed in claim 8.

24. The protective coating as claimed in claim 23, being applied on a kitchenware, a metal protection, or an industry tool.

\* \* \* \* \*